United States Patent
Sierer et al.

(10) Patent No.: US 11,535,319 B2
(45) Date of Patent: Dec. 27, 2022

(54) UNDERCARRIAGE NOISE DAMPING ASSEMBLY

(71) Applicant: Caterpillar Inc., Deerfield, IL (US)

(72) Inventors: Lance O'Dell Sierer, Peoria, IL (US); Aaron Brames, Morton, IL (US); Dennis Earl Roberts, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 905 days.

(21) Appl. No.: 16/404,130

(22) Filed: May 6, 2019

(65) Prior Publication Data
US 2020/0354004 A1 Nov. 12, 2020

(51) Int. Cl.
| | |
|---|---|
| *B62D 55/096* | (2006.01) |
| *G10K 11/162* | (2006.01) |
| *F16B 2/08* | (2006.01) |
| *B62D 55/12* | (2006.01) |

(52) U.S. Cl.
CPC ......... *B62D 55/0963* (2013.01); *B62D 55/12* (2013.01); *F16B 2/08* (2013.01); *G10K 11/162* (2013.01)

(58) Field of Classification Search
CPC .. B62D 55/096; B62D 55/0963; B62D 55/12; F16B 2/08; G10K 11/162
See application file for complete search history.

(56) References Cited

U.S. PATENT DOCUMENTS

| | | |
|---|---|---|
| 3,057,219 A | 10/1962 | Montgomery |
| 3,937,528 A | 2/1976 | Clemens et al. |
| 4,034,618 A | 7/1977 | Groff et al. |
| 4,081,202 A | 3/1978 | Kozuki |
| 4,082,372 A | 4/1978 | Kozuki |
| 4,227,422 A * | 10/1980 | Kawashima ............. F16H 7/06 198/834 |
| 4,332,573 A * | 6/1982 | Uchida ............. B62D 55/0963 474/94 |

(Continued)

FOREIGN PATENT DOCUMENTS

| | | | |
|---|---|---|---|
| ES | 2306580 A1 * | 11/2008 | ......... B62D 55/0963 |
| GB | 2086817 A | 5/1982 | |

OTHER PUBLICATIONS

Machine Translation of ES 2306580 A1, 5 pages (Year: 2008).*

*Primary Examiner* — S. Joseph Morano
*Assistant Examiner* — Emily G. Castonguay
(74) *Attorney, Agent, or Firm* — von Briesen & Roper, s.c.

(57) ABSTRACT

A sprocket damping assembly for a sprocket wheel of a track-type work machine may include an annular damping ring having an annular retention device. The damping ring may include a ring body section having a ring body section radial thickness, and a retention groove section integrally formed at an outboard side of the ring body section. The retention groove section may have a retention groove section axial width and a retention groove section radial thickness. The retention device may have a retention device axial width that is less than or equal to the retention groove section axial width. The retention device is disposed on the retention groove section when the damping ring is disposed on a sprocket drum outer surface of the sprocket wheel to retain the sprocket damping assembly. The retention groove section radial thickness may be less than the ring body section radial thickness.

20 Claims, 7 Drawing Sheets

(56) References Cited

U.S. PATENT DOCUMENTS

| 4,371,362 | A | | 2/1983 | Dorris |
| 4,511,186 | A | * | 4/1985 | Sasamoto ........... B62D 55/0963 152/41 |
| 9,387,893 | B2 | | 7/2016 | Steiner et al. |

* cited by examiner

UNDERCARRIAGE NOISE DAMPING ASSEMBLY

TECHNICAL FIELD

The present disclosure relates generally to track-type work machines and, more particularly, to noise reduction between a drive sprocket of a track-type work machine and links of an endless ground-engaging track meshing with the drive sprocket.

BACKGROUND

Work machines such as track-type tractors are used in a great many different operations, ranging from pushing loose material or debris about a worksite to grading, production dozing or scraping where materials are dug from a substrate, and still other applications related to site preparation, forestry, mining, and general civil engineering. Track-type tractors offer the advantage of a rugged build and substantial capacity for drawbar pull and traction in challenging underfoot conditions, steep terrain, and when towing or pushing large loads. A typical undercarriage of a track-type work machine consists of an endless track made of a number of connected links with shoes mounted thereon, a drive sprocket driven by a power source of the work machine such as an internal combustion engine or electric motor that meshes with the links to drive the track, and a number of idler wheels and rollers that distribute the weight of the work machine along the track.

Track-type work machines are generally quite noisy in operation. Such noise is becoming increasingly objectionable, especially when such work machines are operated in highly populated areas. Environmental regulations, both in the United States and in other countries, are increasingly being directed to the suppression of noise emitted by construction equipment. One source of such noise can be the metal-to-metal impact occurring between the teeth of the drive sprocket and the bushings of the track links during the meshing between the teeth and the links.

Various types of devices have been utilized to reduce the noise generated by the track. For example, U.S. Pat. No. 4,034,618 to Groff et al. discloses a pair of annular treads of resilient material that are mounted about the peripheries of cylindrical wall members on opposite sides of the sprocket and positioned in radial alignment with respective inwardly facing rail surfaces on links of the track. The treads are formed from a plurality of arcuate segments constructed from a plurality of separated tapered pads each having an aligned opening to cooperatively form a continuous cavity within which a curved steel band is disposed. Ends of the steel bands of adjacent segments are connected to each other and/or to the periphery to form the annular treads.

SUMMARY OF THE DISCLOSURE

In one aspect of the present disclosure, a damping ring for a sprocket wheel of a track-type work machine is disclosed. The damping ring may include a ring body section having an annular shape and a ring body section radial thickness, and a retention groove section integrally formed with the ring body section at an outboard side of the ring body section. The retention groove section may have an annular shape and a retention groove section radial thickness that is less than the ring body section radial thickness. The retention groove section is dimensioned to have a retention device disposed thereon to retain the damping ring on a sprocket drum outer surface of a sprocket drum of the sprocket wheel.

In another aspect of the present disclosure, a sprocket damping assembly for a sprocket wheel of a track-type work machine is disclosed. The sprocket damping assembly may include a damping ring having an annular shape and a retention device having an annular shape. The damping ring may include a ring body section having a ring body section radial thickness, and a retention groove section integrally formed with the ring body section at an outboard side of the ring body section. The retention groove section may have a retention groove section axial width and a retention groove section radial thickness. The retention device may have a retention device axial width that is less than or equal to the retention groove section axial width. The retention device is disposed on the retention groove section when the damping ring is disposed on a sprocket drum outer surface of a sprocket drum of the sprocket wheel to retain the damping ring on the sprocket drum outer surface.

In a further aspect of the present disclosure, a track-type work machine is disclosed. The track-type work machine may include a sprocket wheel, a damping ring and a retention device. The sprocket wheel may include a sprocket drum with a sprocket drum outer surface, and a sprocket gear ring extending radially outward from the sprocket drum outer surface. The damping ring may have an annular shape and include a ring body section having a ring body section radial thickness, and a retention groove section integrally formed with the ring body section at an outboard side of the ring body section. The retention groove section may have a retention groove section axial width and a retention groove section radial thickness. The damping ring may be disposed on the sprocket drum outer surface on an outboard side of the sprocket drum and with the ring body section disposed proximate the sprocket gear ring relative to the retention groove section. The retention device may have an annular shape and a retention device axial width that is less than or equal to the retention groove section axial width. The retention device may be disposed on the retention groove section when the damping ring is disposed on the sprocket drum outer surface to retain the damping ring on the sprocket drum outer surface.

Additional aspects are defined by the claims of this patent.

DETAILED DESCRIPTION

Figure 1:
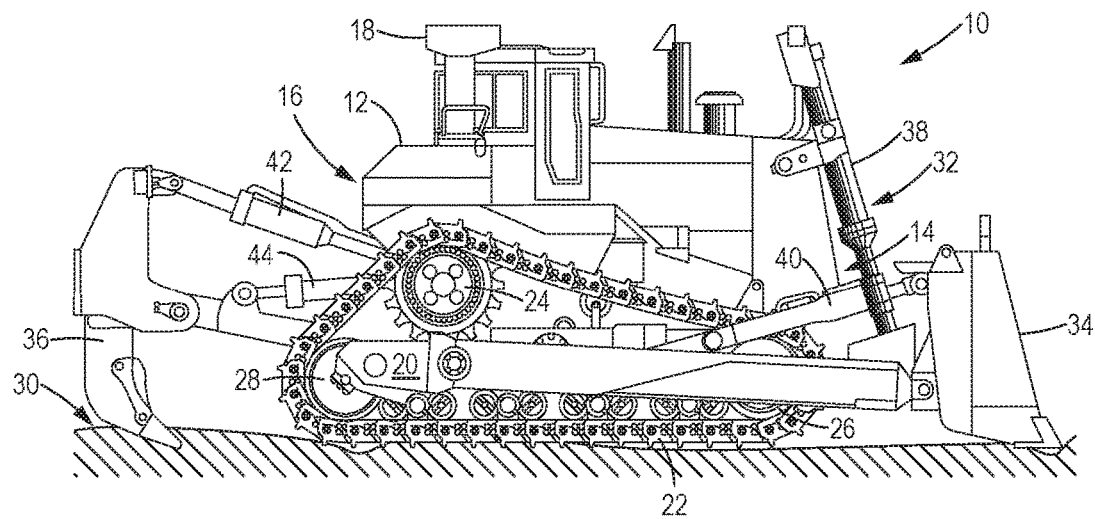
FIG. 1 is a side view of a track-type work machine in which sprocket damping assemblies in accordance with the present disclosure may be implemented.

Referring to FIG. 1, a track-type work machine in the form of a track-type tractor 10 in which a sprocket damping assembly in accordance with the present disclosure may be implemented. While the track-type tractor 10 is illustrated as an example of a track-type work machine, the sprocket damping assembly in accordance with the present disclosure may be applicable to other track-type work machines having undercarriages with endless ground-engaging tracks supported and driven by drive wheels and idler wheels, such as bulldozers, excavators, track loaders and the like. As illustrated in FIG. 1, the track-type tractor 10 may include a tractor frame 12 having a front frame end 14 and a rear frame end 16. An operator cab 18 is mounted between front frame end 14 and rear frame end 16, and the tractor frame 12 is supported by track roller frame 20. The track roller frame 20 has a pair of endless ground-engaging tracks 22 mounted thereon, one of which is visible in the view of FIG. 1. The track-type tractor 10 may be a relatively large and heavy-duty track-type tractor, with the ground-engaging tracks 22 arranged in a high drive configuration, with a drive sprocket 24 positioned at a location vertically higher than a front idler gear 26 and a rear idler gear 28. However, the present disclosure is not limited to track-type work machines having high drive configurations. The drive sprocket 24 is driven by a power source (not shown) of the track-type tractor 10 to drive the ground-engaging tracks 22 and propel the track-type tractor over a work surface 30.

The track-type tractor 10 may also include a hydraulically actuated implement system 32 including a front ground-engaging implement 34 mounted at or toward the front frame end 14, and a rear ground-engaging implement 36 mounted at or toward the rear frame end 16. One or more hydraulic actuators 38 are provided to raise and lower the front ground-engaging implement 34, and various additional hydraulic actuators 40 may be provided for tilting the front ground-engaging implement 34, pivoting the front ground-engaging implement 34 about a vertical axis, or performing various other adjustments. Similarly, hydraulic actuators 42, 44 may be provided for lifting and tilting the rear ground-engaging implement 36. The implement system 32 illustrated and described herein is exemplary for track-type work machines, and those skilled in the art will understand that sprocket damping assemblies in accordance with the present disclosure may be implemented in track-type work machines having other configurations of implement systems 32 or having no implement systems, and such implementations are contemplated by the inventors.

Figure 2:
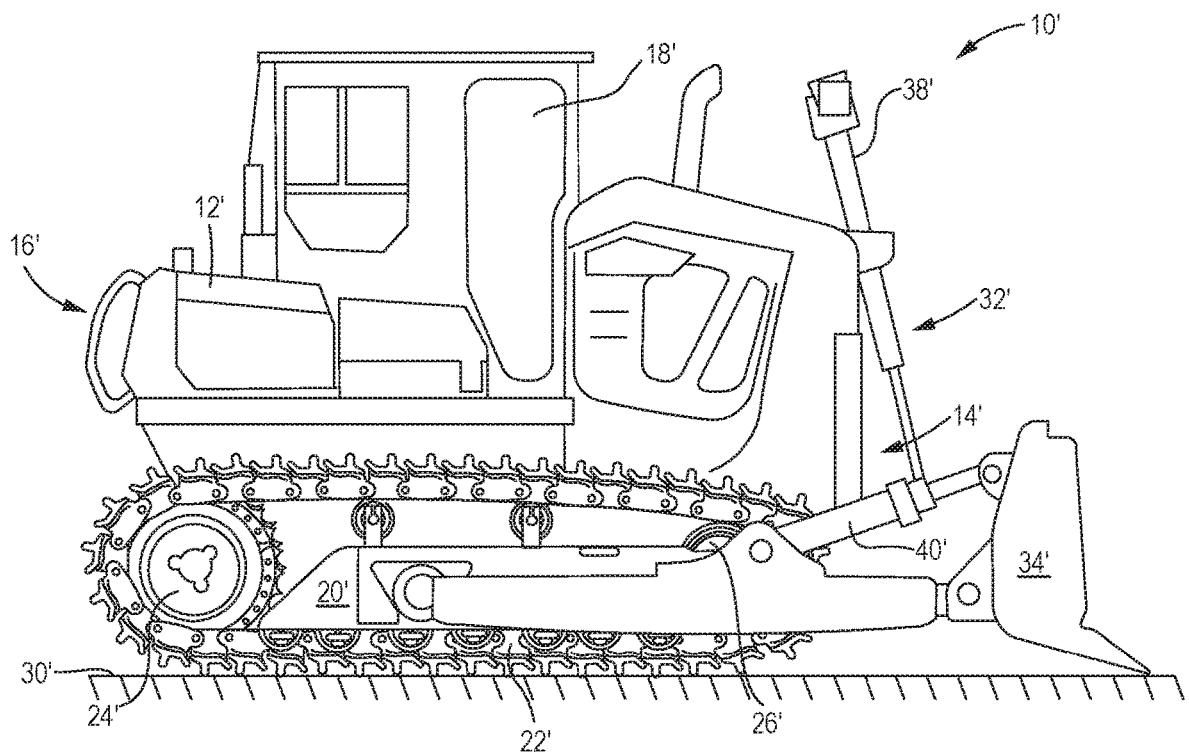
FIG. 2 is a side view of an alternative track-type work machine in which sprocket damping assemblies in accordance with the present disclosure may be implemented.

FIG. 2 illustrates an example of an alternative track-type work machine in the form of a track-type tractor 10' having a low drive configuration with a drive sprocket 24' proximate the level of a ground surface 30' at the rear of the track roller frame 20'. For clarity of illustration and discussion, elements of the track-type tractor 10' that correspond to elements of the track-type tractor 10 are identified by the same reference numeral along with an apostrophe even if those elements are not explicitly discussed herein. Sprocket damping assemblies in accordance with the present disclosure may be implemented in the track-type tractor 10' on the drive sprocket 24', on the front idler gear 26' and on rollers supporting the ground-engaging track 22', and may have application in track-type work machines having track configurations other than the high drive and low drive configurations illustrated herein.

Figure 3:
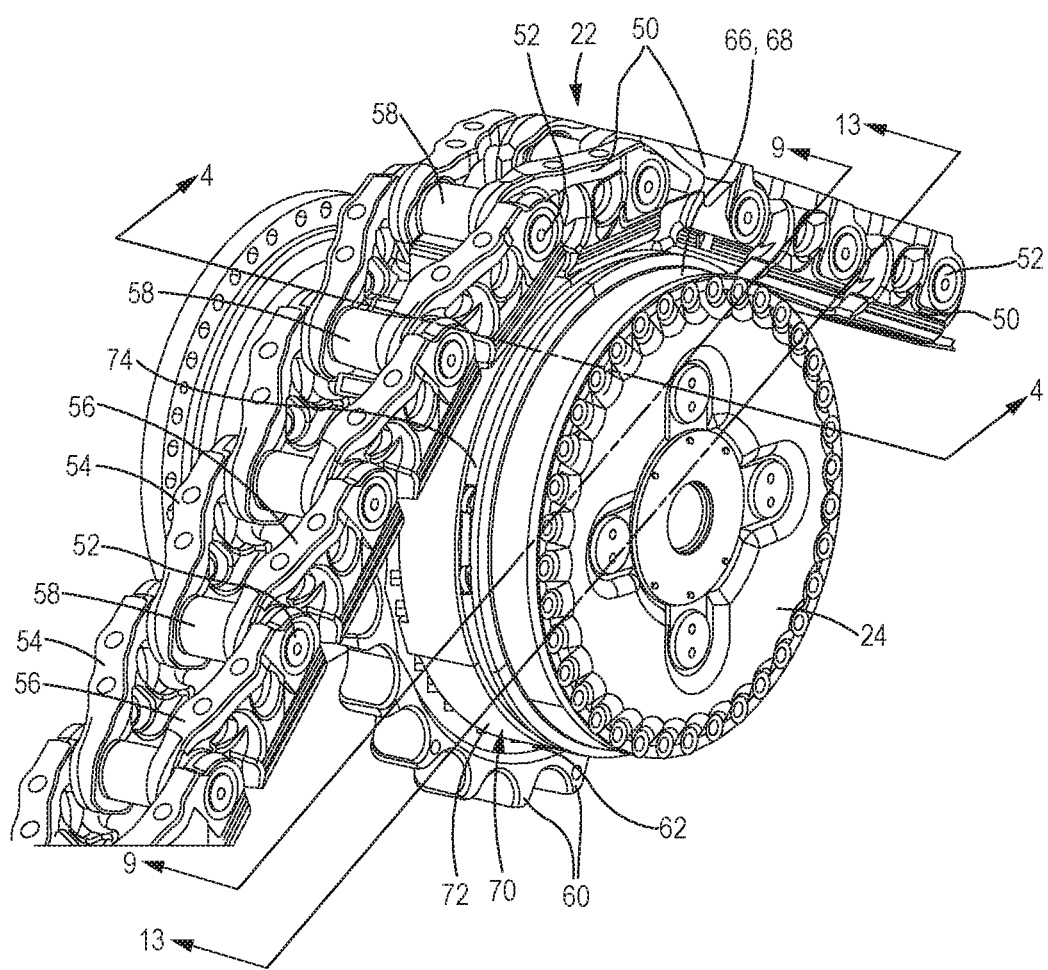
FIG. 3 is an isometric view of a drive sprocket, a portion of an endless ground-engaging track and a sprocket damping assembly in accordance with the present disclosure of the track-type work machine of FIG. 1.

FIG. 3 illustrates the drive sprocket 24 and a portion of the ground-engaging track 22 in greater detail. The configurations and interrelationships between the drive sprocket 24 and the ground-engaging track 22 illustrated and described herein are similar to those between the drive sprocket 24' and the ground-engaging track 22' of the track-type tractor 10' and for other sprocket wheels on which sprocket damping assemblies in accordance with the present disclosure may be installed. The ground-engaging track 22 is formed by a plurality of track links 50 connected to each other by link pins 52. Each of the track links 50 includes an inboard link rail 54 and an outboard link rail 56 that are held together by the link pins 52 connecting the track link 50 to the adjacent track links 50. The link rails 54, 56 are spaced apart by link bushings 58 disposed about the link pins 52. The spacing between the link rails 54, 56 allows sprocket teeth 60 of a sprocket gear ring 62 of the drive sprocket 24 to be disposed between the link rails 54, 56 as the track links 50 pass over the drive sprocket 24. The inboard link rails 54 are disposed on an inboard side of the sprocket gear ring 62 relative to the tractor frame 12, and the outboard link rails 56 are disposed on an outboard side of the sprocket gear ring 62. The track links 50 and the circumferential spacing of the sprocket teeth 60 are sized so that adjacent link bushings 58 for a track link 50 may be simultaneously received into grooves defined between the sprocket teeth 60.

The drive sprocket 24 is a sprocket wheel that includes a sprocket drum 66 with a sprocket drum outer surface 68 on which the sprocket gear ring 62 is mounted. The link rails 54, 56 are spaced from the sprocket drum outer surface 68 as the track links 50 pass over the drive sprocket 24, but the link bushings 58 are impacted and engaged by the sprocket teeth 60 when the link bushings 58 are received into the grooves between the sprocket teeth 60. The impacts of the link bushings 58 with the sprocket gear ring 62 can be noisy, and the noise can even exceed noise restrictions at some work areas with certain track-type work machines 10. In accordance with the present disclosure, a sprocket damping assembly 70 having a damping ring 72 and a retention device 74 is installed on an outboard side of the sprocket drum outer surface 68. The sprocket damping assembly 70 is configured to engage the track links 50 before the link bushings 58 are engaged by the sprocket teeth 60 to reduce the magnitude of impact there between and the corresponding noise generated by the impact. While the sprocket damping assembly 70 is illustrated and described herein as being installed on the drive sprocket 24 or the drive sprocket 24', those skilled in the art will understand that similar sprocket damping assemblies 70 may be installed on other sprocket wheels supporting the ground-engaging track 22, such as the idler gears 26, 28, rollers and the like. Such alternative installations on sprocket wheels are contemplated by the inventors. Additionally, installation of the sprocket damping assembly 70 on the outboard side of the sprocket drum 66 relative to the tractor frame 12 is exemplary, and the sprocket damping assembly 70 may be installed on the sprocket drum 66 on either side of the sprocket gear ring 62 depending on the configuration of a particular sprocket wheel on which the sprocket damping assembly 70 is implemented.

Figure 4:
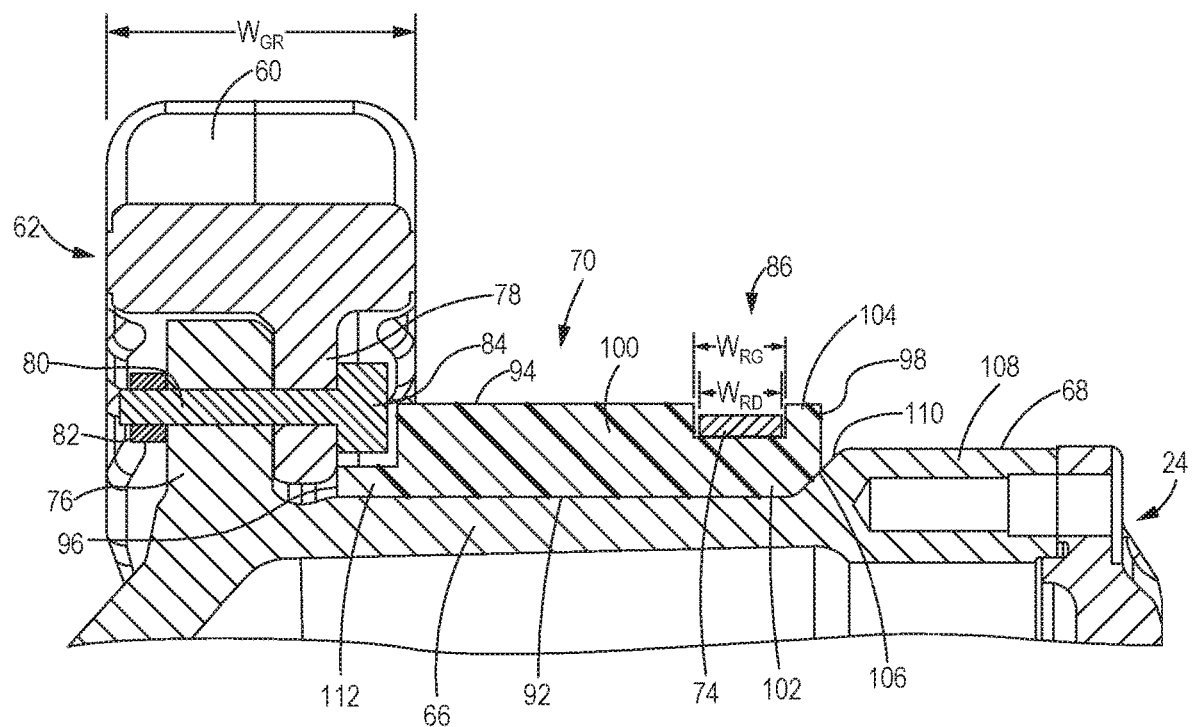
FIG. 4 is a cross-sectional view taken through line 4-4 of FIG. 3 of portions of the drive sprocket and the sprocket damping assembly, and with the ground-engaging track omitted for clarity.
Figure 5:
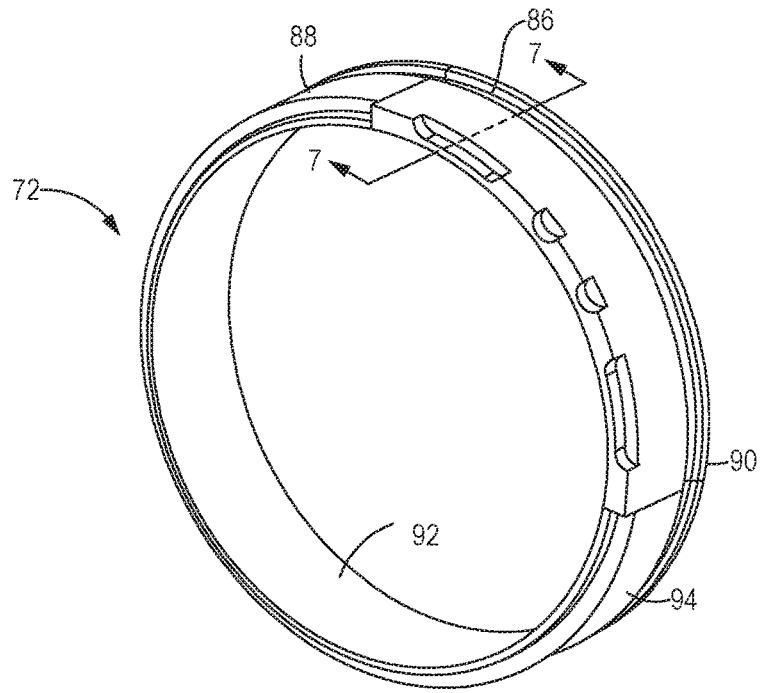
FIG. 5 is an isometric view of an embodiment of a damping ring of the sprocket damping assembly of FIG. 3.

Referring to FIG. 4, the drive sprocket 24 and the sprocket damping assembly 70 are shown in cross-section with the track links 50 omitted for clarity. In the illustrated embodiment, the sprocket drum 66 includes a sprocket drum mounting flange 76 extending radially outward from the sprocket drum outer surface 68 at an inboard side of the sprocket drum 66. The sprocket gear ring 62 includes a gear ring mounting flange 78 extending radially inward and having an inner diameter that is less than an outer diameter of the sprocket drum mounting flange 76 so that the mounting flanges 76, 78 overlap and can be placed in surface-to-surface contact and secured together by a plurality of sprocket mounting bolts 80 and nuts 82. The sprocket gear ring 62 may have a gear ring axial width $w_{GR}$ that is greater than a length of the sprocket mounting bolts 80 so that the sprocket gear ring 62 overlies and covers the nuts 82 and bolt heads 84 of the sprocket mounting bolts 80 to prevent engagement with the link rails 54, 56.

The sprocket damping assembly 70 is disposed on the sprocket drum outer surface 68 outboard of the sprocket gear ring 62. The damping ring 72 may be fabricated from a resilient material, such as rubber, polyurethane, other polymers and elastomers and the like. In some implementations, the resilient material may allow the damping ring 72 to have a damping ring inner diameter $ID_{DR}$ (FIG. 8) that is less than a sprocket drum outer diameter so that the damping ring 72 fits snuggly on the sprocket drum outer surface 68 when installed. The damping ring 72 may be further secured to the sprocket drum 66 by the retention device 74. In the illustrated embodiment, the retention device 74 is implemented as a band clamp 74 that is adjustable to vary the diameter of the band clamp 74. Other devices capable of securing the damping ring 72 to the sprocket drum 66 are contemplated as being used as the retention device 74 as discussed further below. A retention groove 86 may be defined proximate an outboard end of the damping ring 72 and configured to receive the band clamp 74 therein. In other embodiments, a separate clamp groove is not defined in the damping ring 72 to receive the retention device 74. Once installed, the band clamp 74 is tightened to compress the portion of the damping ring 72 between the band clamp 74 and the sprocket drum outer surface 68 to prevent the damping ring 72 from sliding on the sprocket drum 66.

Figure 6:
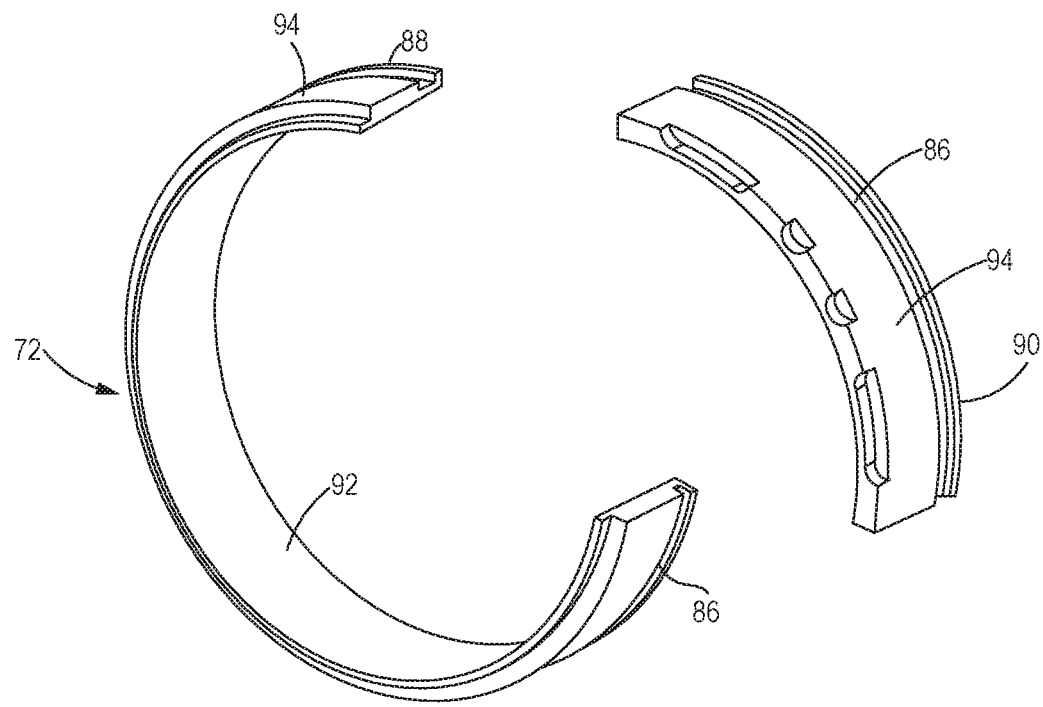
FIG. 6 is an exploded isometric view of the damping ring of FIG. 5.

The damping ring 72 is shown in greater detail in FIGS. 5-8. The damping ring 72 has an annular shape that is complimentary to the shape of the sprocket drum outer surface 68. To facilitate installation, the damping ring 72 may be formed from a plurality of arcuate damping ring sections that are assembled on the sprocket drum 66 and held together and in place by the retention device 74. As illustrated in FIG. 6, in one implementation, the damping ring 72 has a two-piece construction. A damping ring main section 88 may form a majority of the damping ring 72. A damping ring indexing section 90 may form the remainder of the damping ring 72. The damping ring indexing section 90 may include structures to prevent the damping ring 72 from rotating circumferentially about the sprocket drum outer surface 68 as discussed further below. While two damping ring sections 88, 90 are shown in the illustrated embodiment, those skilled in the art will understand that the damping ring 72 may be formed as a single unitary structure or may be divided into additional damping ring sections depending on the requirements for a particular implementation. For example, fabrication requirements or limitations based on size, materials and the like may dictate dividing the damping ring 72 into three or more damping ring sections for implementations on larger drive sprockets 24. Such component manufacturing alternatives for the damping ring 72 are contemplated by the inventors.

Figure 7:
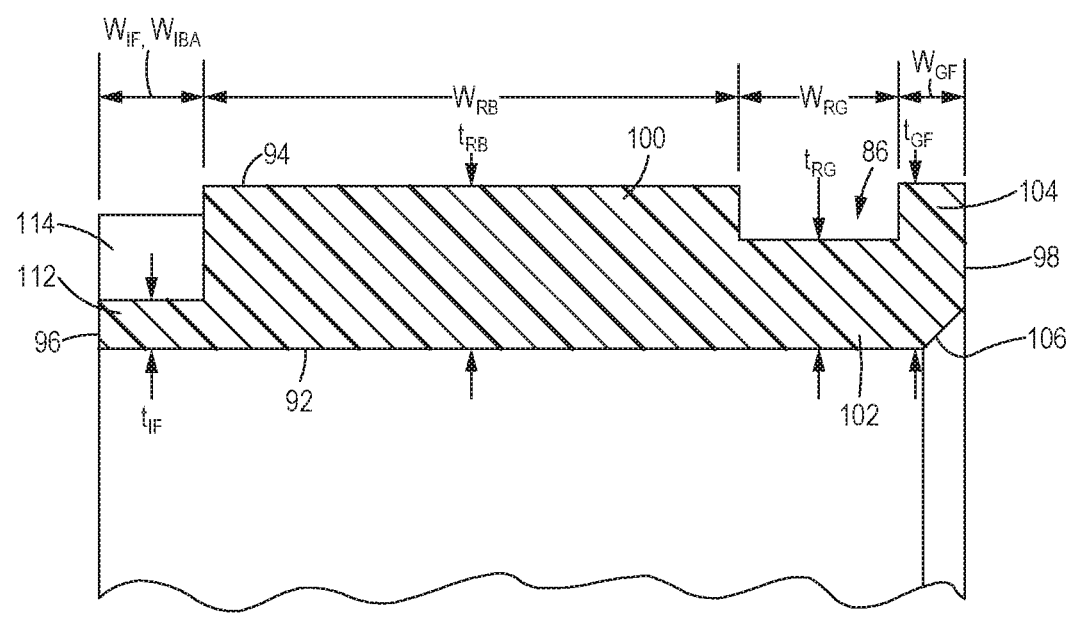
FIG. 7 is a cross-sectional view taken through line 7-7 of FIG. 5 of the damping ring.

The cross-sectional geometry of the damping ring 72 or the illustrated embodiment is shown in greater detail in FIG. 7. A damping ring inner surface 92 may be a continuous surface defining the damping ring inner diameter $ID_{DR}$. If necessary, the damping ring inner surface 92 may have shape that is complimentary to contours of the sprocket drum outer surface 68 on which the damping ring 72 will be installed. A damping ring outer surface 94 may be contoured to vary a damping ring outer diameter $OD_{DR}$ (FIG. 8) as the damping ring outer surface 94 extends from a damping ring inboard edge 96 to a damping ring outboard edge 98. A majority of the damping ring 72 may comprise a ring body section 100 that is axially inward from both damping ring edges 96, 98. The ring body section 100 has a ring body section axial width $w_{RB}$, and a ring body section radial thickness $t_{RB}$ between the corresponding portions of the damping ring surfaces 92, 94. As discussed further below, the ring body section 100 is positioned and dimensioned so that the ring body section 100 will engage the outboard link rails 56 as the track links 50 pass over the drive sprocket 24.

On the outboard side of the ring body section 100, the retention groove 86 may be defined by a retention groove section 102 and a retention groove flange 104 that are integrally formed with the ring body section 100. The retention groove section 102 has a retention groove section axial width $w_{RG}$ that is greater than or equal to a retention device axial width $w_{RD}$ (FIG. 4) of the retention device 74, and a retention groove section radial thickness $t_{RG}$ that is less than the ring body section radial thickness $t_{RB}$ in the illustrated embodiment. As shown in FIG. 7, the portion of the damping ring outer surface 94 at the retention groove section 102 is recessed radially inward toward the damping ring inner surface 92 relative to the portion at the ring body section 100. The retention groove flange 104 is formed with the retention groove section 102 opposite the ring body section 100. The retention groove flange 104 has a retention groove flange axial width $w_{GF}$ terminating at the damping ring outboard edge 98, and a retention groove flange radial thickness $t_{GF}$ that is greater than the retention groove section radial thickness $t_{RG}$, and may be approximately equal to the ring body section radial thickness $t_{RB}$. The portion of the damping ring outer surface 94 at the retention groove flange 104 extends radially outward relative to the portion at the retention groove section 102 to provide an outboard boundary for the retention groove 86 that prevents the retention device 74 from sliding off the damping ring outboard edge 98. In alternative embodiments, the retention groove section radial thickness $t_{RG}$ may be approximately equal to the ring body section radial thickness $t_{RB}$ so that the damping ring outer surface 94 is a continuous surface across the sections 100, 102, 104. In such embodiments, the retention device 74 may be installed on the damping ring outer surface 94 at the retention groove section 102 without the retention groove flange 104 providing an additional outboard boundary.

At an intersection of the damping ring inner surface 92 and the damping ring outboard edge 98, an annular chamfered surface 106 may be defined. As shown in FIG. 4, the sprocket drum outer surface 68 may be contoured with an outboard large outer diameter section 108. The chamfered surface 106 may be configured to be complimentary to a transition portion 110 of the sprocket drum outer surface 68. When the damping ring 72 is installed on the sprocket drum outer surface 68, the chamfered surface 106 may engage the transition portion 110 to further aid in retention of the damping ring 72 on the sprocket drum outer surface 68.

Returning to FIG. 7, the inboard side of the damping ring 72 may be configured to align the damping ring 72 on the sprocket drum 66 and also to reduce the accumulation of material from the work surface 30 at the outboard side of the sprocket gear ring 62. An annular inboard flange 112 may be integrally formed with and extend from the ring body section 100 to the damping ring inboard edge 96. The inboard flange 112 may have an inboard flange axial width $w_{IF}$ that is greater than a distance by which the bolt heads 84 extend from the gear ring mounting flange 78. The inboard flange axial width $w_{IF}$ ensures that the ring body section 100 is spaced from the bolt heads 84 when the damping ring 72 is installed on the sprocket drum 66 with the damping ring inboard edge 96 abutting the sprocket drum mounting flange 76 (FIG. 4). The inboard flange 112 has an inboard flange radial thickness $t_{IF}$ (FIG. 7) that is less than a distance between the bolt heads 84 and the sprocket drum outer surface 68 so that the inboard flange 112 may be inserted there between. When in position, the inboard flange 112 occupies space that is susceptible to accumulation of material from the work surface 30 that can ultimately result in the degradation of the operation of the track-type work machine 10, and thereby reduces the material accumulation on the drive sprocket 24.

Figure 8:
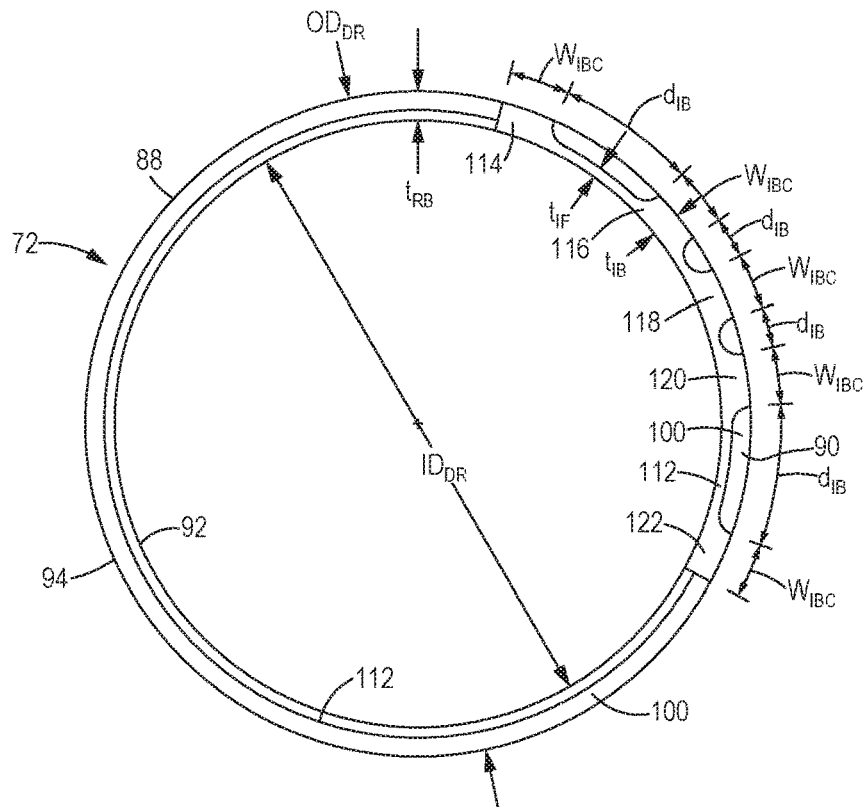
FIG. 8 is a side view of the damping ring of FIG. 5.

The elasticity of the damping ring 72 and the clamping force of the retention device 74 increase the friction between the sprocket drum outer surface 68 and the damping ring inner surface 92 to substantially prevent the damping ring 72 from sliding axially or circumferentially on the sprocket drum outer surface 68. However, such sliding may be possible in certain operating conditions. Circumferential sliding may be further reduced or eliminated by providing positive indexing structures on the damping ring 72. Referring to FIG. 8, the damping ring 72 may include one or more indexing blocks 114, 116, 118, 120, 122 that are integrally formed with the ring body section 100 and the inboard flange 112. The indexing blocks 114, 116, 118, 120, 122 may have an indexing block axial width $w_{IBA}$ (FIG. 7) extending from the ring body section 100 that places the indexing blocks 114, 116, 118, 120, 122 in axial juxtaposition with the bolt heads 84 when the damping ring 72 is installed, and that may be equal to the inboard flange axial width $w_{IF}$. The indexing blocks 114, 116, 118, 120, 122 may have an indexing block radial thickness $t_{IB}$ between the corresponding portions of the damping ring inner surface 92 and the damping ring outer surface 94 that is greater that the distance from the sprocket drum outer surface 68 to the bolt heads 84 to place the indexing blocks 114, 116, 118, 120, 122 in radial juxtaposition with the bolt heads 84 when the damping ring 72 is installed, and that may be equal to the ring body radial thickness $t_{IF}$. The indexing blocks 114, 116, 118, 120, 122 also have an indexing block circumferential width $w_{IBC}$ that is less than a bolt head circumferential distance $d_{BH}$ (FIG. 9) between adjacent bolt heads 84 so that the indexing blocks 114, 116, 118, 120, 122 may be inserted there between. Adjacent indexing blocks 114, 116, 118, 120, 122 are spaced from each other by an indexing block circumferential distance $d_{IB}$ that varies based on the number of bolt heads 84 that are to be disposed there between after installation.

Figure 9:
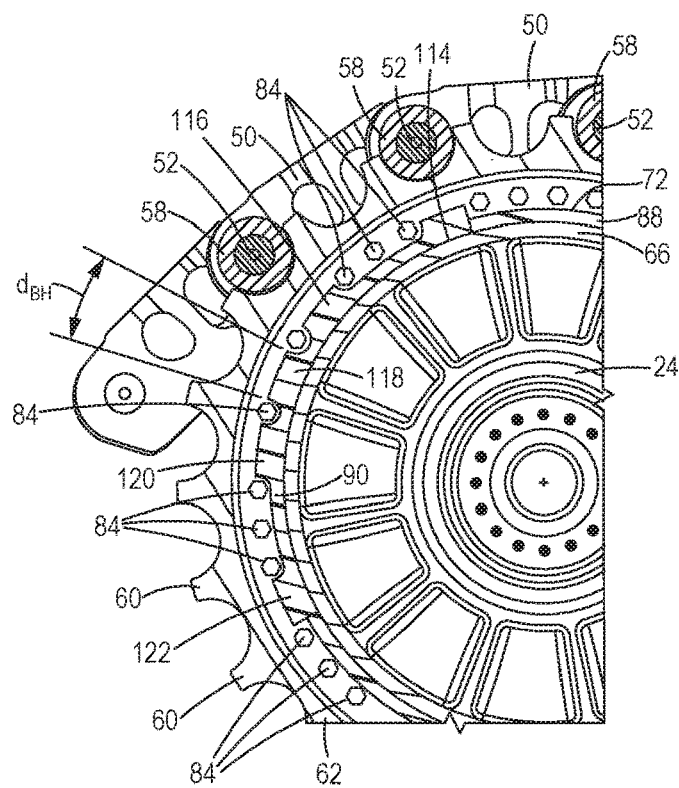
FIG. 9 is a cross-sectional view taken through line 9-9 of FIG. 3 of portions of the drive sprocket, the ground-engaging track and the sprocket damping assembly.

As shown in FIG. 9, the damping ring 72 is installed with the indexing blocks 114, 116, 118, 120, 122 disposed between adjacent bolt heads 84. The actual values of the indexing block circumferential widths $w_{IBC}$ and the indexing block circumferential distances $d_{IB}$ will be dictated by the configuration and spacing of the bolt heads 84. As illustrated in FIGS. 8 and 9, the indexing block circumferential widths $w_{IBC}$ of the indexing blocks 114, 116, 118, 120, 122 are approximately equal because the bolt head circumferential distances $d_{BH}$ between the corresponding adjacent pairs of bolt heads 84 are approximately equal. The indexing block circumferential distances $d_{IB}$ between the indexing blocks 116, 118 and the indexing blocks 118, 120 may be approximately equal so that one bolt head 84 is disposed between the adjacent indexing blocks 116, 118, 120. The indexing block circumferential distances $d_{IB}$ between the indexing blocks 114, 116 and the indexing blocks 120, 122 are greater to accommodate three bolt heads 84 there between due to the close proximity of the bolt heads 84 in those areas of the sprocket gear ring 62. With the indexing blocks 114, 116, 118, 120, 122 inserted between the bolt heads 84, the indexing blocks 114, 116, 118, 120, 122 will engage the corresponding bolt heads 84 to prevent the damping ring 72 from slipping circumferentially about the sprocket drum outer surface 68. While the present embodiment includes five indexing blocks 114, 116, 118, 120, 122 formed in the damping ring indexing section 90, those skilled in the art will understand that additional or fewer indexing blocks may be formed on the damping ring 72 at various positions about the circumference of the damping ring outer surface 94 as necessary to positively engage the bolt heads 84 and prevent circumferential slippage of the damping ring 72 on the sprocket drum outer surface 68.

Figure 10:
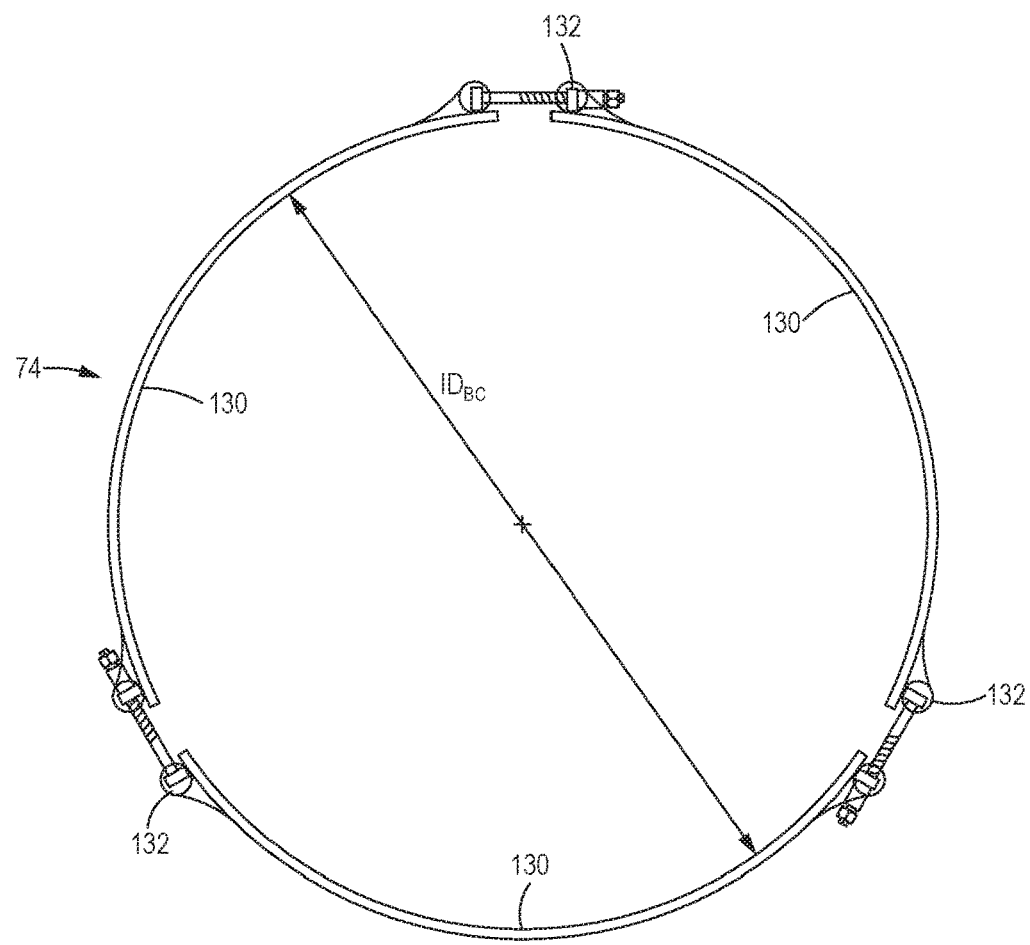
FIG. 10 is a side view of an embodiment of a clamping device of the sprocket damping assembly of FIG. 3 in the form of a band clamp.
Figure 11:
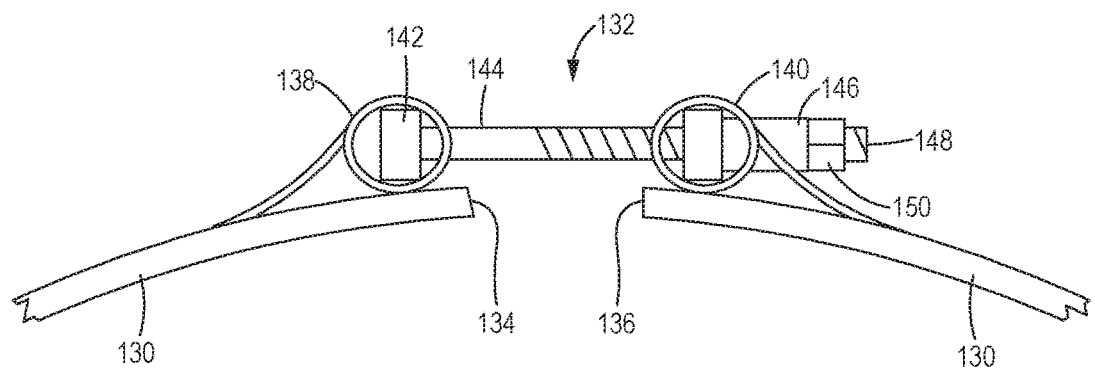
FIG. 11 is an enlarge side view of an exemplary band clamp diameter adjustment mechanism of the band clamp of FIG. 10 connecting adjacent band clamp section ends.

FIGS. 10 and 11 illustrate the exemplary embodiment of the retention device 74 in the form of the band clamp 74. Referring to FIG. 10, the band clamp 74 is formed by a plurality of arcuate band clamp sections 130 connected to each other by a plurality of band clamp diameter adjustment mechanisms 132. The band clamp sections 130 may be formed from thin strips of steel, other metals or other appropriate materials that may be flexible enough for the band clamp sections 130 to conform to the damping ring outer surface 94 at the retention groove 86 and to the sprocket drum outer surface 68, while also being resistant to stretching under tension due to the hoop stresses created when the band clamp 74 is tightened around the retention groove 86 and the sprocket drum 66.

The band clamp diameter adjustment mechanisms 132 may be any appropriate mechanism capable of connecting adjacent ends of the band clamp sections 130 and adjusting a circumferential distance between the joined ends of the band clamp sections 130 to vary a band clamp inner diameter $ID_{BC}$. The enlarged view of FIG. 11 illustrates one example of a band clamp diameter adjustment mechanism 132 in the form of a T-bolt clamp mechanism connecting a first band clamp section end 134 to a second band clamp section end 136. A first mounting bracket 138 is connected to the first band clamp section end 134, and a second mounting bracket 140 is connected to the second band clamp section end 136. The first mounting bracket 138 receives an adjustment bolt head 142 of an adjustment bolt 144 in a manner that allows the adjustment bolt 144 to rotate about an axis parallel to a longitudinal axis of the band clamp 74, but does not allow the adjustment bolt 144 to rotate about its own longitudinal axis. The second mounting bracket 140 receives an adjustment sleeve 146 through which a threaded end 148 of the adjustment bolt 144 passes. The second mounting bracket 140 engages the adjustment sleeve 146 with similar rotational constraints as the first mounting bracket 138 engages the adjustment bolt head 142. An adjustment nut 150 is screwed onto the portion of the threaded end 148 that extends from the adjustment sleeve 146. When the adjustment nut 150 is rotated in a first direction on the threaded end 148, the distances between the adjustment nut 150 and the adjustment bolt head 142, and the mounting brackets 138, 140, decrease, and correspondingly the distance between the band clamp section ends 134, 136 decreases, to decrease the band clamp inner diameter $ID_{BC}$ and tighten the band clamp 74 in the retention groove 86. Rotating the adjustment nut 150 in the opposite direction allows the distance between the band clamp section ends 134, 136 to thereby increase the band clamp inner diameter $ID_{BC}$ and loosen the band clamp 74.

The T-bolt clamp mechanism is exemplary, and those skilled in the art will understand that alternative mechanisms can be used to connect the band clamp section ends 134, 136 and adjust the band clamp inner diameter $ID_{BC}$. Additionally, the band clamp diameter adjustment mechanisms 132 may be connected to the band clamp sections 130 such that the band clamp section ends 134, 136 overlap to place the inner surface of the band clamp 74 in contact with the damping ring outer surface 94 through the entire 360° circumference of the clamp groove section 102. Moreover, the band clamp 74 may be formed from a single band clamp section 130, or divided into any number of band clamp sections 130 necessary for a particular implementation of the sprocket damping assembly 70, and be connected by a corresponding number of band clamp diameter adjustment mechanisms 132. Where multiple band clamp diameter adjustment mechanisms 132 are implemented, greater flexibility and ranges of adjustment of the band clamp inner diameter $ID_{BC}$ may be available for installation of the sprocket damping assembly 70.

As mentioned above, the band clamp 74 is an example of a retention device 74 that may be implemented in the sprocket damping assembly 70. Alternative retention devices 74 are contemplated by the inventors. For example, the retention device 74 could include a rope, cable, metal strip, nylon cord or the like that can be wrapped around the damping ring 72 at the retention groove section 102, tightened to a necessary tightness to retain the damping ring 72, and have the free ends secured together by a fastening device such as a clamp or ferrule that will prevent slippage of the ends and loosening of the retention device 74. Such retention devices 74 could be cut off when the retention device 74 and/or the damping ring 72 require replacement due to wear or damage. In other embodiments, instead of being a physically separate component, the retention device 74 may be formed with the damping ring 72, such as by molding the material of the damping ring 72 over the retention device 74 so that the retention device 74 is carried with the damping ring 72. The use of additional alternative retention devices 74 capable of engaging the damping ring 72 to retentively secure the damping ring 72 to the sprocket drum 66 is contemplated by the inventors for use in sprocket damping assemblies 70 in accordance with the present disclosure.

INDUSTRIAL APPLICABILITY

Figure 12:
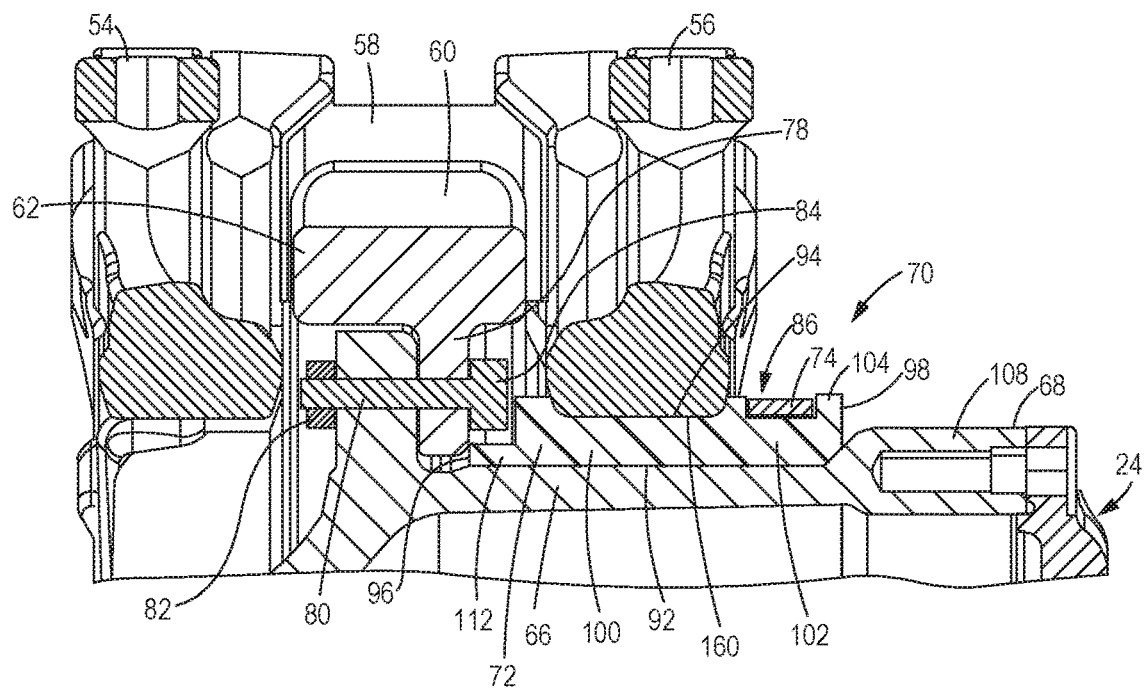
FIG. 12 is the cross-sectional view of FIG. 4 with the corresponding portion of the ground-engaging track included.
Figure 13:
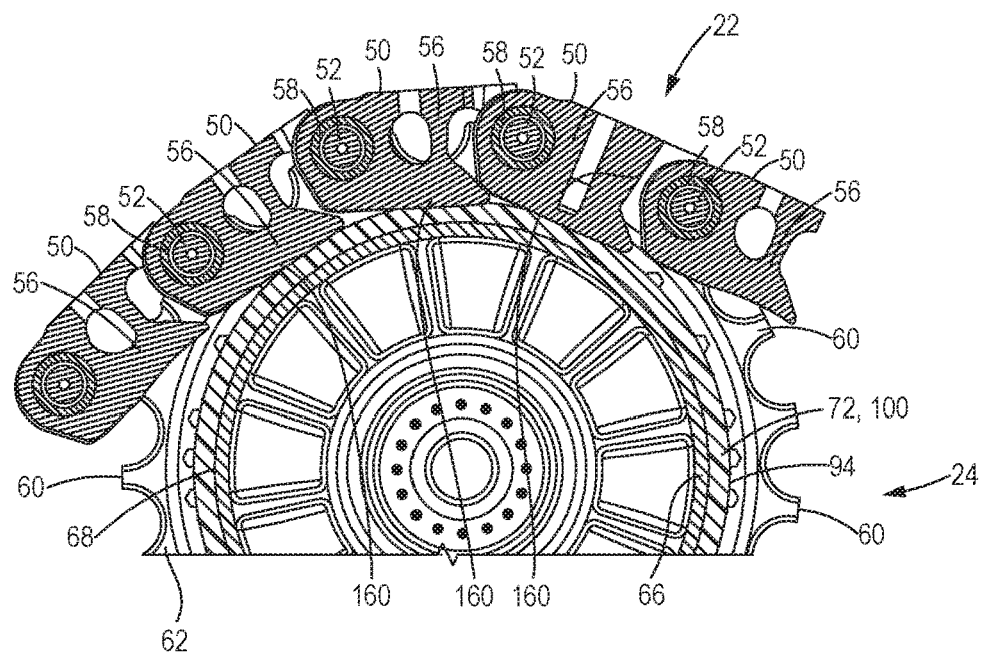
FIG. 13 is a cross-sectional view taken through line 13-13 of FIG. 3 of portions of the drive sprocket, the ground-engaging track and the sprocket damping assembly.

FIGS. 12 and 13 illustrate the drive sprocket 24 and track links 50 of the ground-engaging track 22 with the sprocket damping assembly 70 installed there between. Referring to FIG. 12, the inboard flange 112 and the ring body section 100 position the ring body section 100 beneath the outboard link rails 56. The retention groove 86 and the band clamp 74 may be disposed outboard of the outboard link rail 56 to avoid contact between the band clamp 74 and its band clamp diameter adjustment mechanisms 132 and the outboard link rails 56. The ring body section axial width $w_{RB}$ may be greater than an axial width of inward facing rail surfaces 160 of the outboard link rails 56. The ring body section radial thickness $t_{RB}$ is greater than a minimum distance between the sprocket drum outer surface 68 and the inward facing rail surface 160 of an outboard link rail 56 when both link bushings 58 of the track link 50 are received within the grooves of the sprocket gear ring 62. Consequently, the ring body section 100 is compressed between the sprocket drum outer surface 68 and the inward facing rail surface 160.

As shown in the side view of FIG. 13, the ring body section 100 of the damping ring 72 engages the inward facing rail surface 160 of the track link 50 before the sprocket teeth 60 of the sprocket gear ring 62 engage the link bushing 58 of the track link 50 approaching the drive sprocket 24. The engagement of the inward facing rail surface 160 by the damping ring 72 slows the movement of the link bushing 58 toward the sprocket gear ring 62 to reduce the magnitude of the impact between the link bushing 58 and the sprocket gear ring 62 and the volume of the impact noise generated at impact. The damping of the impact occurs in both the forward gears and the reverse gears.

In one exemplary implementation of the sprocket damping assembly 70, the damping ring 72 was fabricated from polytetramethylene ether glycol (PTMEG) 85A urethane rubber. During testing, use of the sprocket damping assembly 70 yielded a 2.5-8.8 dBA reduction in noise from the drive sprocket 24. Such noise reductions may be sufficient for some track-type work machines 10 to be able to operate with prescribed noise limits for work areas in which the work machines 10 could not previously be used.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A damping ring for a sprocket wheel of a track-type work machine, comprising:
   a ring body section having an annular shape and a ring body section radial thickness; and
   a retention groove section integrally formed with the ring body section at an outboard side of the ring body section, the retention groove section having an annular shape and a retention groove section radial thickness that is less than the ring body section radial thickness, wherein the retention groove section is dimensioned to have a retention device disposed thereon to retain the damping ring on a sprocket drum outer surface of a sprocket drum of the sprocket wheel.

2. The damping ring of claim 1, comprising a retention groove flange integrally formed with the retention groove section at an outboard end of the retention groove section, the retention groove flange having an annular shape and a retention groove flange radial thickness that is greater than the retention groove section radial thickness, wherein the ring body section, the retention groove section and the retention groove flange define a retention groove that receives the retention device therein.

3. The damping ring of claim 2, wherein the ring body section, the retention groove section and the retention groove flange define a damping ring inner surface having a damping ring inner diameter, and wherein the damping ring has a chamfered surface at an intersection of the damping ring inner surface and a damping ring outboard edge.

4. The damping ring of claim 1, comprising an inboard flange integrally formed with the ring body section at an inboard end of the ring body section, the inboard flange having an annular shape and an inboard flange radial thickness that is less than the ring body section radial thickness, wherein the inboard flange radial thickness is less than a distance between the sprocket drum outer surface and a bolt head of a sprocket mounting bolt connecting a sprocket gear ring to the sprocket drum so that the inboard flange is insertable between the sprocket drum outer surface and the bolt head.

5. The damping ring of claim 4, comprising a first indexing block integrally formed with the inboard flange and the ring body section and extending radially outward from the inboard flange, wherein the first indexing block has a first indexing block circumferential width that is less than a first bolt head circumferential distance between first adjacent bolt heads of sprocket mounting bolts so that the first indexing block is insertable between the first adjacent bolt heads and the first indexing block engages the first adjacent bolt heads to prevent the damping ring from rotating circumferentially about the sprocket drum outer surface.

6. The damping ring of claim 5, comprising a second indexing block integrally formed with the inboard flange and the ring body section and extending radially outward from the inboard flange, wherein the second indexing block has a second indexing block circumferential width that is less than a second bolt head circumferential distance between second adjacent bolt heads of sprocket mounting bolts so that the second indexing block is insertable between the second adjacent bolt heads, and wherein the second indexing block is spaced from the first indexing block by an indexing block circumferential distance that allows the second indexing block to be inserted between the second adjacent bolt heads at the same time as the first indexing block is inserted between the first adjacent bolt heads.

7. The damping ring of claim 1, wherein the damping ring is formed from a plurality of arcuate damping ring sections.

8. A sprocket damping assembly for a sprocket wheel of a track-type work machine, comprising:
 a damping ring having an annular shape, the damping ring comprising:
  a ring body section having a ring body section radial thickness, and
  a retention groove section integrally formed with the ring body section at an outboard side of the ring body section, the retention groove section having a retention groove section axial width and a retention groove section radial thickness; and
 a retention device having an annular shape and a retention device axial width that is less than or equal to the retention groove section axial width, wherein the retention device is disposed on the retention groove section when the damping ring is disposed on a sprocket drum outer surface of a sprocket drum of the sprocket wheel to retain the damping ring on the sprocket drum outer surface.

9. The sprocket damping assembly of claim 8, wherein the retention groove section radial thickness is less than the ring body section radial thickness, wherein the damping ring comprises a retention groove flange integrally formed with the retention groove section at an outboard end of the retention groove section, the retention groove flange having an annular shape and a retention groove flange radial thickness that is greater than the retention groove section radial thickness, and wherein the ring body section, the retention groove section and the retention groove flange define a retention groove that receives the retention device therein.

10. The sprocket damping assembly of claim 8, wherein the damping ring comprises an inboard flange integrally formed with the ring body section at an inboard end of the ring body section, the inboard flange having an annular shape and an inboard flange radial thickness that is less than the ring body section radial thickness, wherein the inboard flange radial thickness is less than a distance between the sprocket drum outer surface and a bolt head of a sprocket mounting bolt connecting a sprocket gear ring to the sprocket drum so that the inboard flange is insertable between the sprocket drum outer surface and the bolt head.

11. The sprocket damping assembly of claim 10, wherein the damping ring comprises an indexing block integrally formed with the inboard flange and the ring body section and extending radially outward from the inboard flange, wherein the indexing block has an indexing block circumferential width that is less than a bolt head circumferential distance between adjacent bolt heads of sprocket mounting bolts so that the indexing block is insertable between the adjacent bolt heads and the indexing block engages the adjacent bolt heads to prevent the damping ring from rotating circumferentially about the sprocket drum outer surface.

12. The sprocket damping assembly of claim 8, wherein the damping ring is formed from a plurality of arcuate damping ring sections.

13. The sprocket damping assembly of claim 8, wherein the retention device comprises a band clamp having a band clamp diameter adjustment mechanism that is adjusted when the band clamp is disposed on the retention groove section so that a band clamp inner diameter of the band clamp is less than a retention groove section outer diameter of the retention groove section to compress the retention groove section between the band clamp and the sprocket drum outer surface.

14. The sprocket damping assembly of claim 8, wherein the retention device comprises a band clamp having a plurality of arcuate band clamp sections and a plurality of band clamp diameter adjustment mechanisms, wherein each of the plurality of band clamp diameter adjustment mechanisms connects adjacent ones of the plurality of arcuate band clamp sections to each other, and wherein each of the plurality of band clamp diameter adjustment mechanisms is adjustable to vary a band clamp inner diameter of the band clamp.

15. The sprocket damping assembly of claim 8, wherein the damping ring is fabricated from a resilient material.

16. A track-type work machine comprising:
a sprocket wheel comprising:
a sprocket drum with a sprocket drum outer surface, and
a sprocket gear ring extending radially outward from the sprocket drum outer surface;
a damping ring having an annular shape, the damping ring comprising:
a ring body section having a ring body section radial thickness, and
a retention groove section integrally formed with the ring body section at an outboard side of the ring body section, the retention groove section having a retention groove section axial width and a retention groove section radial thickness, wherein the damping ring is disposed on the sprocket drum outer surface on an outboard side of the sprocket drum and with the ring body section disposed proximate the sprocket gear ring relative to the retention groove section; and
a retention device having an annular shape and a retention device axial width that is less than or equal to the retention groove section axial width, wherein the retention device is disposed on the retention groove section when the damping ring is disposed on the sprocket drum outer surface to retain the damping ring on the sprocket drum outer surface.

17. The track-type work machine of claim 16, wherein the retention groove section radial thickness is less than the ring body section radial thickness, wherein the damping ring comprises a retention groove flange integrally formed with the retention groove section at an outboard end of the retention groove section, the retention groove flange having an annular shape and a retention groove flange radial thickness that is greater than the retention groove section radial thickness, wherein the ring body section, the retention groove section and the retention groove flange define a retention groove that receives the retention device therein.

18. The track-type work machine of claim 16, wherein the sprocket drum comprises:
a sprocket drum mounting flange extending radially outward from the sprocket drum outer surface; and
a plurality of sprocket mounting bolts connecting the sprocket gear ring to the sprocket drum mounting flange with bolt heads of the plurality of sprocket mounting bolts being disposed radially outward from the sprocket drum outer surface on an outboard side of the sprocket drum mounting flange and the sprocket gear ring; and
wherein the damping ring comprises an inboard flange integrally formed with the ring body section at an inboard end of the ring body section, the inboard flange having an annular shape and an inboard flange radial thickness that is less than the ring body section radial thickness, wherein the inboard flange radial thickness is less than a distance between the sprocket drum outer surface and the bolt heads of the plurality of sprocket mounting bolts and the inboard flange is inserted between the sprocket drum outer surface and the bolt heads.

19. The track-type work machine of claim 18, wherein the damping ring comprises an indexing block integrally formed with the inboard flange and the ring body section and extending radially outward from the inboard flange, wherein the indexing block has an indexing block circumferential width that is less than a bolt head circumferential distance between adjacent bolt heads of the plurality of sprocket mounting bolts so that the indexing block is insertable between the adjacent bolt heads and the indexing block engages the adjacent bolt heads to prevent the damping ring from rotating circumferentially about the sprocket drum outer surface.

20. The track-type work machine of claim 16, wherein the damping ring is formed from a plurality of arcuate damping ring sections.

* * * * *